United States Patent
Smithson

(10) Patent No.: US 6,439,609 B1
(45) Date of Patent: Aug. 27, 2002

(54) WEBBING GUIDE

(75) Inventor: Alan George Smithson, Wetheral (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/485,112

(22) PCT Filed: Aug. 7, 1998

(86) PCT No.: PCT/GB98/02384
§ 371 (c)(1),
(2), (4) Date: Feb. 3, 2000

(87) PCT Pub. No.: WO99/07581
PCT Pub. Date: Feb. 18, 1999

(30) Foreign Application Priority Data

Aug. 7, 1997 (GB) .............................. 9716758

(51) Int. Cl.[7] .............................................. B60R 22/24
(52) U.S. Cl. .................... 280/801.1; 280/804; 280/808; 297/483
(58) Field of Search ............... 280/801.1, 804, 280/808; 297/483; B60R 22/24

(56) References Cited

U.S. PATENT DOCUMENTS

| | | | | |
|---|---|---|---|---|
| 4,762,338 A | * | 8/1988 | Hayden | 280/808 |
| 5,037,135 A | * | 8/1991 | Collins | 280/801.1 X |
| 5,207,452 A | * | 5/1993 | Collins | 280/808 X |
| 5,295,713 A | * | 3/1994 | McCune et al. | 280/801 X |
| 5,415,433 A | * | 5/1995 | Pleiffer | 280/808 |
| 5,601,311 A | * | 2/1997 | Pfeiffer et al. | 280/801.1 |
| 5,667,246 A | * | 9/1997 | Miller, III | 280/808 |
| 5,673,936 A | * | 10/1997 | Mondel | 280/808 |
| 5,762,373 A | * | 6/1998 | Sugimoto | 280/808 |
| 5,918,903 A | * | 7/1999 | Ito | 280/801.1 |
| 6,168,206 B1 | * | 1/2001 | Greib et al. | 280/801.1 X |

FOREIGN PATENT DOCUMENTS

| | | | | |
|---|---|---|---|---|
| EP | WO8303767 | * | 11/1983 | 280/808 |
| GB | 2020961 | * | 11/1979 | 280/808 |
| GB | 2062446 | * | 5/1981 | 280/808 |
| GB | 2174888 | * | 11/1986 | 280/808 |
| JP | 0062821 | * | 5/1977 | 280/808 |
| JP | 404024147 | * | 1/1992 | 280/801.1 |
| JP | 404113960 | * | 4/1992 | 280/801.1 |

* cited by examiner

*Primary Examiner*—Lanna Mai
*Assistant Examiner*—Toan C To
(74) *Attorney, Agent, or Firm*—Markell Seitzman

(57) ABSTRACT

A webbing guide for a vehicle safety comprises a guide surface in the form of a generally cylindrical bar (6) which has a continuous outer surface over which seat belt webbing passes in use following an upside-down U-shaped path. The surface comprises a top portion and two side portions (8) on either side of the top portion, and the top portion and at least one of the side portions are shaped so as to present a countered surface to the seat belt webbing. Preferably, the central area (7) of the top portion is raised, and the central area (9) of one or both side portions (8), is recessed, but the opposite contour arrangement could be provided with the central area of the top portion recessed and the central area of one or both side portions raised.

5 Claims, 5 Drawing Sheets

WEBBING GUIDE

BACKGROUND OF THE INVENTION

The present invention relates to a webbing guide for a vehicle safety restraint seat belt. Such a webbing guide is commonly known as a D-ring and is fixed to a vehicle support pillar behind the seat, approximately at shoulder level, to provide an upper anchorage for, and to guide, the belt webbing as it changes direction from the vertical line coming from the retractor usually fixed at the base of the pillar, to a diagonal line across the occupant's torso.

Traditional webbing guides comprise a guiding surface in the form of a bar suspended below a hole about which the guide is pivoted on the pillar. Ideally the bar should be set a large distance from the pivot point but this is impractical in the small space available in a vehicle and would make the guides too expensive for practical use.

A common problem with such guides is that the webbing tends to bunch at one end of the bar when it is subject to off-centre loads during a crash, increasing frictional forces between the webbing and the bar and inhibiting the free running of the webbing, leading to excess wear on the belt, and additional crash loading for the vehicle occupant. In extreme cases, the webbing can jam. This is evidently undesirable. Attempts have been made to minimise the problem for example by providing grooves in the surface of the bar. This is expensive and has only shown limited success in alleviating the problem.

BRIEF SUMMARY OF THE INVENTION

It is an object of the invention to provide an improved webbing guide.

A seat belt webbing guide comprising a guide surface in the form of a generally cylindrical bar which has a continuous outer surface over which seat belt webbing passes in use, following an upside-down U-shaped path, there being a top portion to the surface and two side portions, the top portion and at least one side portion are shaped so as to present a contoured surface to the seat belt webbing.

Preferably, the central area of the top portion is raised, and the central area of the at least one of the side portions is recessed.

Alternatively, an opposite contour arrangement could be provided in that the central area of the top portion is recessed and the central area of the at least one side portion may then be raised.

The surface presented to the seat belt webbing may be smooth or may be provided with formations such as being inset with grooves.

Preferably the contour of the surface is such that each warp and weft fibre of the belt webbing contacts the surface for a substantially identical distance, i.e. the surface of the bar presented to the webbing, has a substantially identical sized contour, measured in a circumferential sense around the bar, across the width and along the length of the contact patch of the webbing with the loop.

According to a preferred embodiment of the present invention, each side portion of the surface has its central area recessed.

The raised hump in the central area of the top portion of the surface effectively vectorises the contact forces between the webbing and the surface towards the centre of the surface, providing self-centring for the guide. Additionally the transverse force components thus created augment frictional resistance to sideways movement of the webbing.

The guide of the invention thus has increased resistance to transverse movement of the webbing, thus resisting bunching of the webbing, and also a self-centring property leading to improved stability.

The recessed side portion or portions serve to equalise the contact length of the webbing with the guide over the width of the webbing to avoid higher loads in the centre which would cause excessive wear on the belt and on the guide and possibly lead to failure.

BRIEF DESCRIPTION OF THE DRAWINGS

For a better understanding of the present invention, and to show how the same may be carried into effect, reference will now be made to the accompanying drawings in which.

DETAILED DESCRIPTION OF THE INVENTION

Figure 4:
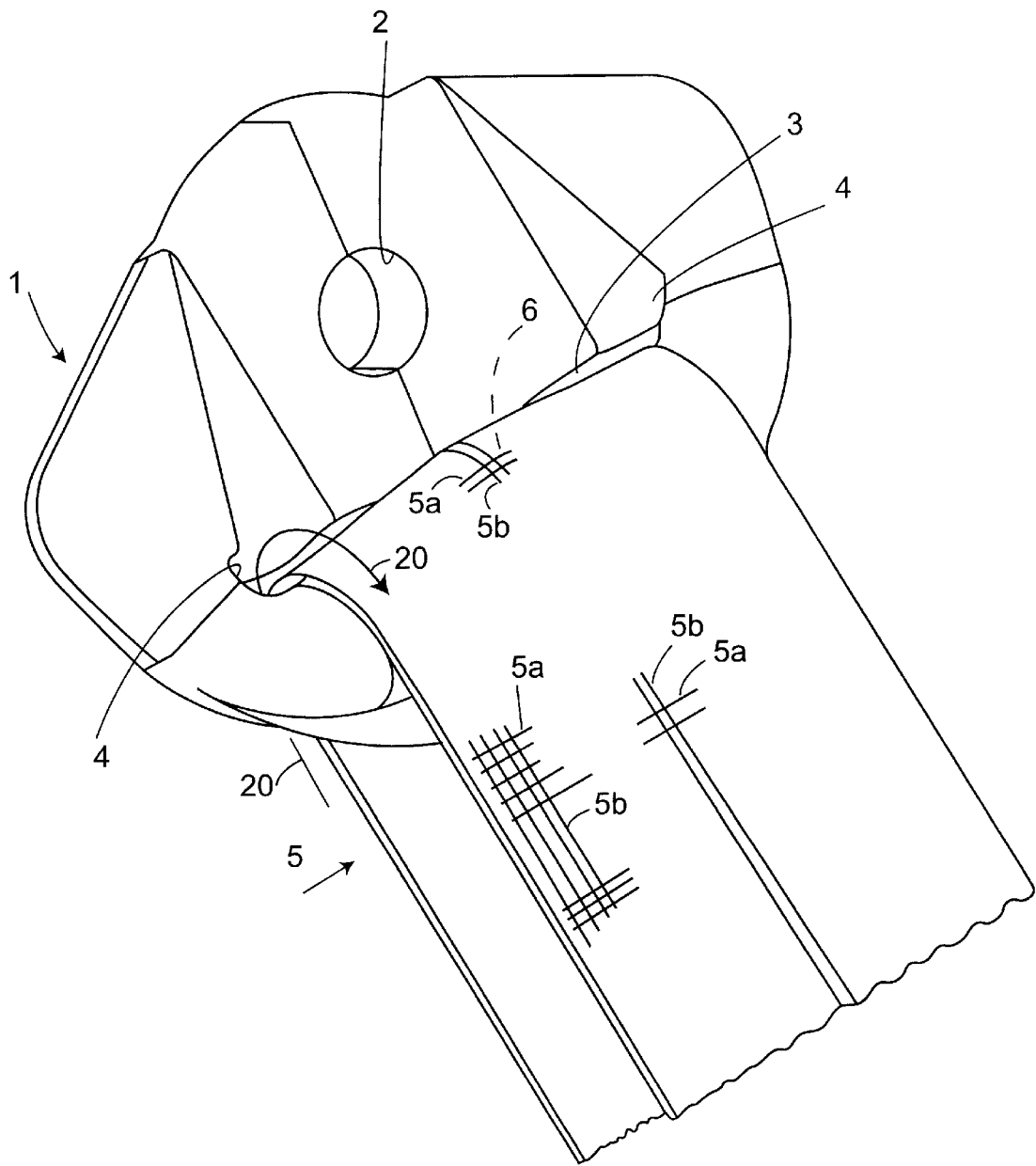
FIG. 4 shows a length of seat belt webbing positioned about a web guide.

The guide 1 has a mounting hole 2 through which a bolt is inserted to fix it to a vehicle support pillar. The mounting is done so that the guide 1 can pivot about this hole 2. A generally horizontal slot 3 is formed below the hole 2. This slot has up-turned ends 4. Belt webbing 5 (see FIG. 4) passes through his slot in the vehicle, contacting the guide surface formed by the upper part of the generally cylindrical bar 6, below slot 3. Arrow 20 shows the direction of travel of the webbing 5 as the webbing moves out or the guide 1.

Preferably the contour of the surface is such that each warp 5a and weft 5b fibre of the belt webbing contacts the surface for a substantially identical distance, i.e. the surface of the bar presented to the webbing has a substantially identical sized contour, measured in a circumferential sense around the bar, across the width and along the length of the contact patch of the webbing with the loop.

Figure 1:
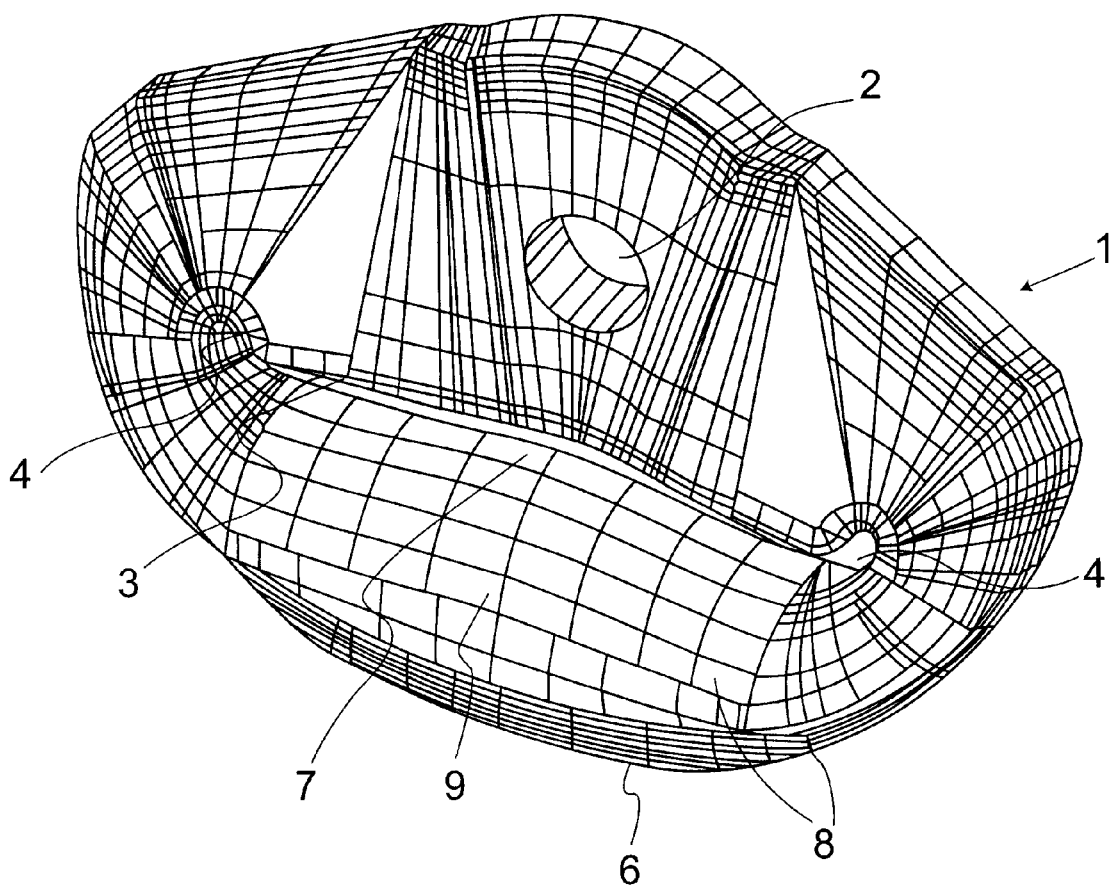
FIG. 1 is an oblique side view of a guide according to the invention with contour lines marked to illustrate the unique shape of its surface.
Figure 2:
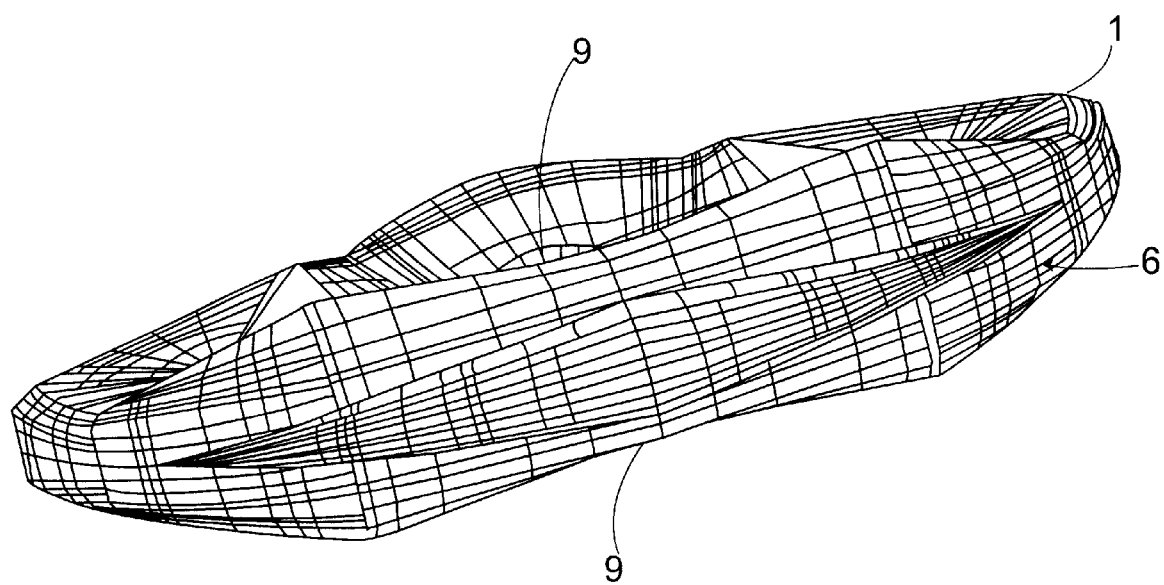
FIG. 2 is an oblique bottom view of the guide of FIG. 1.

The central top area of bar 6 is raised with a smoothly contoured hump 7. The side surfaces 8 of bar 6 have recessed, or depressed central areas 9 (best seen in FIG. 2).

Figure 3:
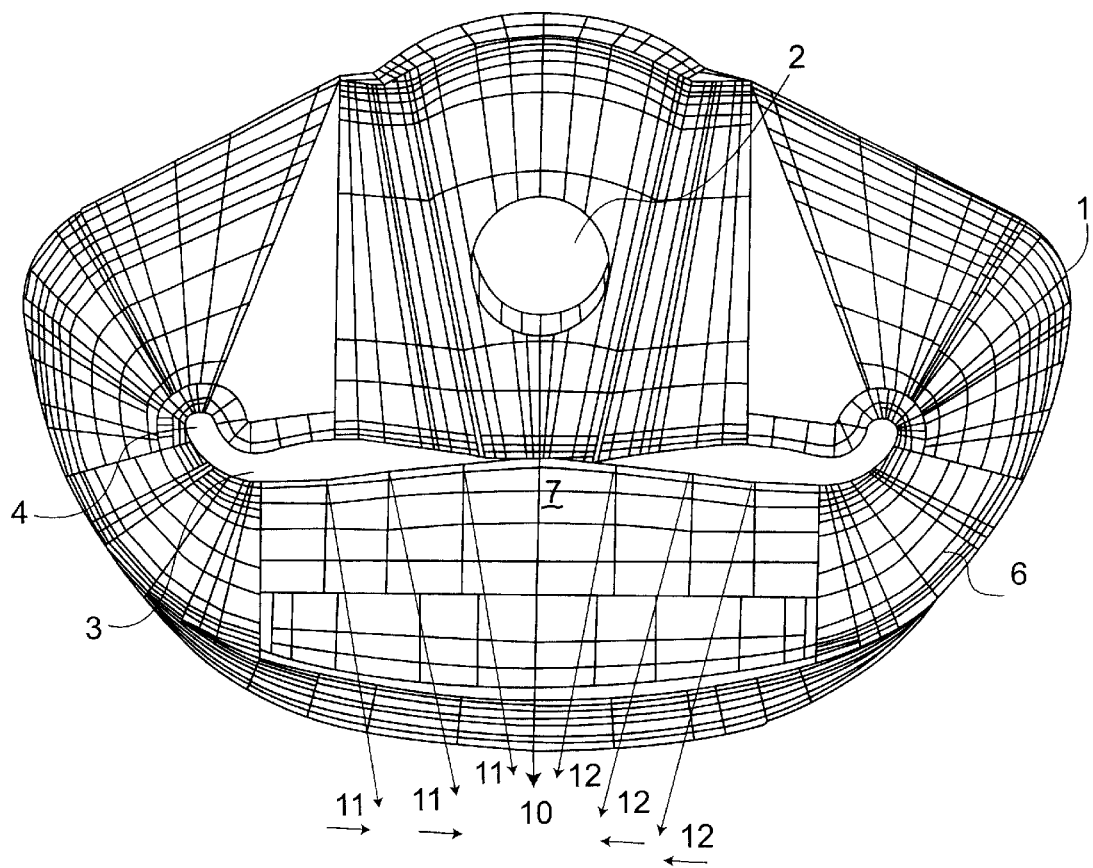
FIG. 3 is a side view of the guide of FIG. 1 illustrating the vectorised load components.

FIG. 3 illustrates the lines of forces on the bar 6 when webbing (not shown) is loaded.

The lines of force, shown by the arrows 10, 11, 12 are generally perpendicular to the surface at any one point.

In the region of the apex of the central top hump 7, the lines of force are therefore directed vertically along the centre line of the guide 1 as shown by arrow 10. On each side of this arrow 10 are shown the vectorised loads to the sides of slot 3, and these are indicated by arrows 11 and 12. It can clearly be seen that these vectorised loads have transverse load components, all directed inwards towards the centre line 10. Thus the guide 1 is self-centring with this shape of construction.

Figure 5:
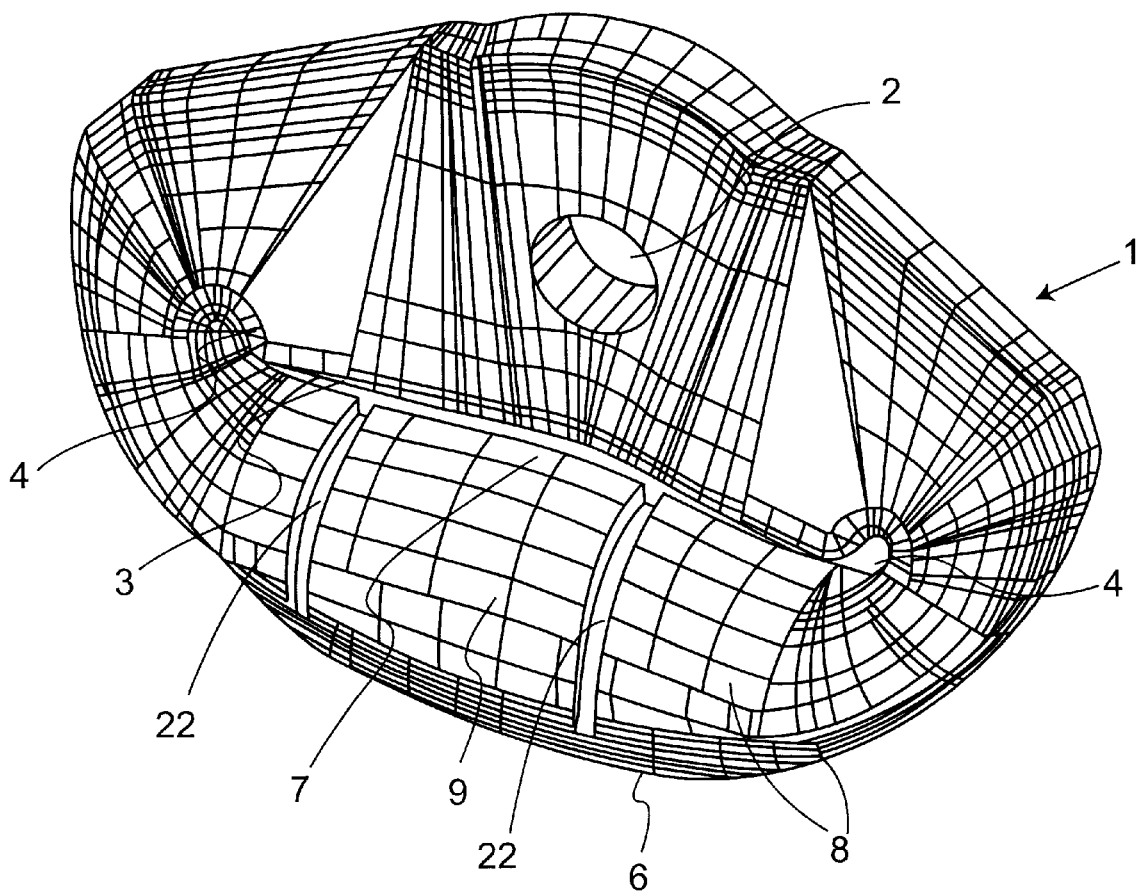
FIG. 5 shows an alternate embodiment of the invention.

Reference is made to FIG. 5, which illustrates an alternate embodiment of the invention in which the guide 1 includes a plurality of grooves 22 on the guide surface.

What is claimed is:

1. A seat belt system including a webbing guide and seat belt webbing comprising:

a generally cylindrical bar having a continuous outer guide surface over which the seat belt webbing passes in use, the outer guide surface having, in consecutive order in relation to a direction of travel of the webbing:

a first or back side portion, a top portion, and a second or front side portion;

wherein the outer guide surface has a central region and two outer regions separated by and adjacent to the central region and the outer guide surface includes a first contour, as viewed perpendicular to the direction of travel of the webbing, the first contour being situated in a central region of the top portion, and a second contour, opposite to the first contour as viewed perpendicular to the direction of travel of the webbing, the second contour being in the central region of the first or back side portion of the bar, wherein one of the first and the other contour comprises a raised portion, and the second contour comprises a recessed portion, such that each fibre of the belt webbing contact the outer guide surface of the bar for a substantially identical distance measured in a circumferential sense around the bar.

2. An apparatus according to claim 1 wherein the first contour is raised, and at least the second contour is recessed.

3. An apparatus according to claim 1 wherein the outer guide surface is smooth.

4. An apparatus according to claim 1 wherein the shape of the guide surface effectively vectorises the contact forces between the webbing and the surface towards a central area of the surface, providing self-centering for the webbing.

5. An apparatus according to claim 1 wherein the shape of the surface is such that transverse force components created augment frictional resistance to sideways movement of the webbing.

* * * * *